(12) United States Patent
Corliss

(10) Patent No.: US 8,844,880 B1
(45) Date of Patent: Sep. 30, 2014

(54) TWO-PLACE, COLLECTIVE PITCH AND THROTTLE CONTROL

(75) Inventor: McGregor Lee Corliss, West Bountiful, UT (US)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 351 days.

(21) Appl. No.: 13/199,671

(22) Filed: Sep. 7, 2011

Related U.S. Application Data

(60) Provisional application No. 61/381,291, filed on Sep. 9, 2010, provisional application No. 61/403,099, filed on Sep. 9, 2010, provisional application No. 61/403,097, filed on Sep. 9, 2010, provisional application No. 61/381,313, filed on Sep. 9, 2010, provisional application No. 61/403,111, filed on Sep. 9, 2010, provisional application No. 61/381,347, filed on Sep. 9, 2010, provisional application No. 61/403,136, filed on Sep. 9, 2010, provisional application No. 61/403,134, filed on Sep. 9, 2010, provisional application No. 61/460,572, filed on Jan. 3, 2011, provisional application No. 61/403,098, filed on Sep. 9, 2010, provisional application No. 61/403,081, filed on Sep. 9, 2010, provisional application No. 61/403,135, filed on Sep. 9, 2010, provisional application No. 61/466,177, filed on Mar. 22, 2011, provisional application No. 61/409,475, filed on Nov. 2, 2010, provisional application No. 61/403,113, filed on Sep. 9, 2010, provisional application No. 61/409,478, filed on Nov. 2, 2010, provisional application No. 61/409,476, filed on Nov. 2, 2010, provisional application No. 61/409,482, filed on Nov. 2, 2010, provisional application No. 61/409,470, filed on Nov. 2, 2010, provisional (Continued)

(51) Int. Cl.
*B64C 27/56* (2006.01)
*B64C 13/04* (2006.01)

(52) U.S. Cl.
USPC .............................. 244/229; 244/234; 74/523

(58) Field of Classification Search
USPC ................. 244/220, 221, 224, 229, 230, 234; 345/161; 463/38; 74/519, 523, 527, 74/529
See application file for complete search history.

(56) References Cited

U.S. PATENT DOCUMENTS 1,947,901 A * 2/1934 La Cierva .......................... 244/8
2,352,342 A * 6/1944 Pitcairn ......................... 416/102

(Continued)

*Primary Examiner* — Joseph W Sanderson
(74) *Attorney, Agent, or Firm* — Pate Baird, PLLC

(57) ABSTRACT

A heliplane operates with a fixed wing at high velocities, and particularly at high advance ratios, while using a rotary wing maintained in motion at all speeds. At high advance ratios, the rotor wing eventually may be rotated primarily to maintain its stability, rather than depending upon the majority of lift. Meanwhile, a collective pitch control is provided and located between pilot and copilot. A single control provides control of both collective pitch and throttle by both pilots. One pilot will have to operate the control with the left hand, while the other may use their right hand. Nevertheless, both throttles push away from the pilot, regardless of which one is in control of the aircraft, while a single collective lever is relied upon.

20 Claims, 10 Drawing Sheets

Related U.S. Application Data application No. 61/517,413, filed on Apr. 19, 2011, provisional application No. 61/468,964, filed on Mar. 29, 2011, provisional application No. 61/409,487, filed on Nov. 2, 2010, provisional application No. 61/409,494, filed on Nov. 2, 2010, provisional application No. 61/456,219, filed on Nov. 2, 2010, provisional application No. 61/456,221, filed on Nov. 2, 2010, provisional application No. 61/456,220, filed on Nov. 2, 2010, provisional application No. 61/432,488, filed on Jan. 13, 2011, provisional application No. 61/506,572, filed on Jul. 11, 2011, provisional application No. 61/519,075, filed on May 16, 2011, provisional application No. 61/519,055, filed on May 16, 2011, provisional application No. 61/460,573, filed on Jan. 4, 2011, provisional application No. 61/461,223, filed on Jan. 13, 2011, provisional application No. 61/429,282, filed on Jan. 3, 2011, provisional application No. 61/429,289, filed on Jan. 3, 2011, provisional application No. 61/499,996, filed on Jun. 22, 2011, provisional application No. 61/575,196, filed on Aug. 17, 2011, provisional application No. 61/575,204, filed on Aug. 18, 2011.

(56) References Cited

U.S. PATENT DOCUMENTS

| | | | | |
|---|---|---|---|---|
| 3,403,734 | A | * | 10/1968 | Herrmann ................... 416/25 |
| 3,957,226 | A | | 5/1976 | Daggett, Jr. et al. |
| 4,012,015 | A | * | 3/1977 | Nelson et al. ............... 244/220 |
| 4,099,671 | A | | 7/1978 | Leibach |
| 4,114,843 | A | * | 9/1978 | Robinson .................... 244/229 |
| 4,130,259 | A | * | 12/1978 | Carlson et al. .............. 244/234 |
| 4,134,560 | A | * | 1/1979 | Messerschmidt ........... 244/234 |
| 4,200,252 | A | | 4/1980 | Logan et al. |
| 4,473,203 | A | * | 9/1984 | Barnoin et al. .............. 244/224 |
| 5,209,430 | A | | 5/1993 | Wilson et al. |
| 5,301,900 | A | * | 4/1994 | Groen et al. ............. 244/17.25 |
| 5,427,336 | A | * | 6/1995 | Haggerty et al. ............ 244/229 |
| 5,527,004 | A | * | 6/1996 | Haggerty et al. ............ 244/229 |
| 6,352,220 | B1 | | 3/2002 | Banks et al. |
| 7,637,180 | B2 | * | 12/2009 | Yamanaka .................... 74/523 |
| 8,235,330 | B2 | * | 8/2012 | Rozovski ..................... 244/234 |
| 8,240,617 | B2 | * | 8/2012 | Biest et al. ................... 244/223 |
| 2009/0302170 | A1 | * | 12/2009 | Rozovski ..................... 244/221 |
| 2011/0024551 | A1 | * | 2/2011 | Biest et al. ....................... 244/6 |

* cited by examiner

TWO-PLACE, COLLECTIVE PITCH AND THROTTLE CONTROL

RELATED APPLICATIONS

This application claims the benefit of U.S. Provisional Patent Application Ser. No. 61/381,291, filed on Sep. 9, 2010.

This application incorporates herein by reference U.S. Provisional Patent Application Ser. No. 61/403,099, filed on Sep. 9, 2010, U.S. Provisional Patent Application Ser. No. 61/403,097, filed on Sep. 9, 2010, U.S. Provisional Patent Application Ser. No. 61/381,313, filed on Sep. 9, 2010, U.S. Provisional Patent Application Ser. No. 61/403,111, filed on Sep. 9, 2010, U.S. Provisional Patent Application Ser. No. 61/381,347, filed on Sep. 9, 2010, U.S. Provisional Patent Application Ser. No. 61/403,136, filed on Sep. 9, 2010, U.S. Provisional Patent Application Ser. No. 61/403,134, filed on Sep. 9, 2010, U.S. Provisional Patent Application Ser. No. 61/460,572, filed on Jan. 3, 2011, U.S. Provisional Patent Application Ser. No. 61/403,098, filed on Sep. 9, 2010, U.S. Provisional Patent Application Ser. No. 61/403,081, filed on Sep. 9, 2010, U.S. Provisional Patent Application Ser. No. 61/403,135, filed on Sep. 9, 2010, U.S. Provisional Patent Application Ser. No. 61/466,177, filed on Mar. 22, 2011, U.S. Provisional Patent Application Ser. No. 61/409,475, filed on Nov. 2, 2010, U.S. Provisional Patent Application Ser. No. 61/403,113, filed on Sep. 9, 2010, U.S. Provisional Patent Application Ser. No. 61/409,478, filed on Nov. 2, 2010, U.S. Provisional Patent Application Ser. No. 61/409,476, filed on Nov. 2, 2010, U.S. Provisional Patent Application Ser. No. 61/409,482, filed on Nov. 2, 2010, U.S. Provisional Patent Application Ser. No. 61/409,470, filed on Nov. 2, 2010, U.S. Provisional Patent Application Ser. No. 61/517,413, filed on Apr. 19, 2011, U.S. Provisional Patent Application Ser. No. 61/468,964, filed on Mar. 29, 2011, U.S. Provisional Patent Application Ser. No. 61/409,487, filed on Nov. 2, 2010, U.S. Provisional Patent Application Ser. No. 61/409,494, filed on Nov. 2, 2010, U.S. Provisional Patent Application Ser. No. 61/456,219, filed on Nov. 2, 2010, U.S. Provisional Patent Application Ser. No. 61/456,221, filed on Nov. 2, 2010, U.S. Provisional Patent Application Ser. No. 61/456,220, filed on Nov. 2, 2010, U.S. Provisional Patent Application Ser. No. 61/432,488, filed on Jan. 13, 2011, U.S. Provisional Patent Application Ser. No. 61/506,572, filed on Jul. 11, 2011, U.S. Provisional Patent Application Ser. No. 61/519,075, filed on May 16, 2011, U.S. Provisional Patent Application Ser. No. 61/519,055, filed on May 16, 2011, U.S. Provisional Patent Application Ser. No. 61/460,573, filed on Jan. 4, 2011, U.S. Provisional Patent Application Ser. No. 61/461,223, filed on Jan. 13, 2011, U.S. Provisional Patent Application Ser. No. 61/429,282, filed on Jan. 3, 2011, U.S. Provisional Patent Application Ser. No. 61/429,289, filed on Jan. 3, 2011, U.S. Provisional Patent Application Ser. No. 61/499,996, filed on Jun. 22, 2011, U.S. Provisional Patent Application Ser. No. 61/575,196, filed on Aug. 17, 2011, and U.S. Provisional Patent Application Ser. No. 61/575,204, filed on Aug. 17, 2011.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotating wing aircraft, and, more particularly to rotating wing aircraft relying on autorotation of a rotor to provide lift.

2. The Background Art

Rotating wing aircraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways inasmuch as powered rotation of the rotating wing provides the needed lift. This makes rotating wing aircraft particularly useful for landing in urban locations or undeveloped areas without a proper runway.

The most common rotating wing aircraft in use today are helicopters. A helicopter typically includes a fuselage, housing an engine and passenger compartment, and a rotor, driven by the engine, to provide lift. Forced rotation of the rotor causes a reactive torque on the fuselage. Accordingly, conventional helicopters require either two counter rotating rotors or a tail rotor in order to counteract this reactive torque.

Another type of rotating wing aircraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e. autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

Although rotating wing aircraft provide the significant advantage of vertical takeoff and landing (VTOL), they are much more limited in their maximum flight speed than are fixed wing aircraft. The primary reason that prior rotating wing aircraft are unable to achieve high flight speed is a phenomenon known as "retreating blade stall." As the fuselage of the rotating wing aircraft moves in a flight direction, rotation of the rotor causes each blade thereof to be either "advancing" or "retreating."

That is, in a fixed-wing aircraft, all wings move forward in fixed relation, with the fuselage. In a rotary-wing aircraft, the fuselage moves forward with respect to the air. However, rotor blades on both sides move with respect to the fuselage. Thus, the velocity of any point on any blade is the velocity of that point, with respect to the fuselage, plus the velocity of the fuselage. A blade is advancing if it is moving in the same direction as the flight direction. A blade is retreating if it is moving opposite the flight direction.

The rotor blades are airfoils that provide lift that depends on the speed of air flow thereover. The advancing blade therefore experiences much greater lift than the retreating blade. One technical solutions to this problem is that the blades of the rotors are allowed to "flap." That is, the advancing blade is allowed to fly or flap upward in response to the increased air speed thereover such that its blade angle of attack is reduced. This reduces the lift exerted on the blade. The retreating blade experiences less air speed and tends to fly or flap downward such that its blade angle of attack is increased, which increases the lift exerted on the blade.

Flap enables rotating wing aircraft to travel in a direction perpendicular to the axis of rotation of the rotor. However, lift equalization due to flapping is limited by a phenomenon known as "retreating blade stall." As noted above, flapping of the rotor blades increases the angle of attack of the retreating blade. However, at certain higher speeds, the increase in the blade angle of attack required to equalize lift on the advancing and retreating blades results in loss of lift (stalling) of the retreating blade.

A second limit on the speed of rotating wing aircraft is the drag at the tips of the rotor. The tip of the advancing blade is moving at a speed equal to the speed of the aircraft and relative to the air, plus the speed of the tip of the blade with respect to the aircraft. That is equal to the sum of the flight speed of the rotating wing aircraft plus the product of the length of the blade and the angular velocity of the rotor. In helicopters, the rotor is forced to rotate in order to provide both upward lift and thrust in the direction of flight. Increasing the speed of a helicopter therefore increases the air speed at the rotor or blade tip, both because of the increased flight speed and the increased angular velocity of the rotors required to provide supporting thrust.

The air speed over the tip of the advancing blade can therefore exceed the speed of sound even though the flight speed is actually much less. As the air speed over the tip approaches the speed of sound, the drag on the blade becomes greater than the engine can overcome. In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotating wing aircraft is reverse air flow over the retreating blade. As noted above, the retreating blade is traveling opposite the flight direction with respect to the fuselage. At certain high speeds, portions of the retreating blade are moving rearward, with respect to the fuselage, slower than the flight speed of the fuselage. Accordingly, the direction of air flow over these portions of the retreating blade is reversed from that typically designed to generate positive lift. Air flow may instead generate a negative lift, or downward force, on the retreating blade. For example, if the blade angle of attack is upward with respect to wind velocity, but wind is moving over the wing in a reverse direction, the blade may experience negative lift.

The ratio of the maximum air speed of a rotating wing aircraft to the maximum air speed of the tips of the rotor blades is known as the "advance ratio. The maximum advance ratio of rotary wing aircraft available today is less than 0.5, which generally limits the top flight speed of rotary wing aircraft to less than 200 miles per hour (mph). For most helicopters, that maximum achievable advance ratio is between about 0.3 and 0.4.

In view of the foregoing, it would be a further advance in the art to simplify the controls in the cockpit of a rotorcraft. Particularly it would be an advance to provide controls on a center console, in which pilots on both sides could pull a single set of collective pitch and yet still push forward on the throttle, whether in right or left hand operation.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

In view of the foregoing, in accordance with the invention as embodied and broadly described herein, a method and apparatus are disclosed in one embodiment of the present invention as including a pilot collective pitch control may be configured as a single 'T'-shaped lever accessible from both starboard and port pilot seats. The leg of the 'T' is the lever, and the top of the 'T' is the handle or grip by which motion and force are applied. At each end of the grip a throttle know is available for gripping by thumb and one or more fingers moving the top of the knob forward and advances the throttle.

A corresponding apparatus and flight control system for performing the method are also disclosed and claimed herein.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
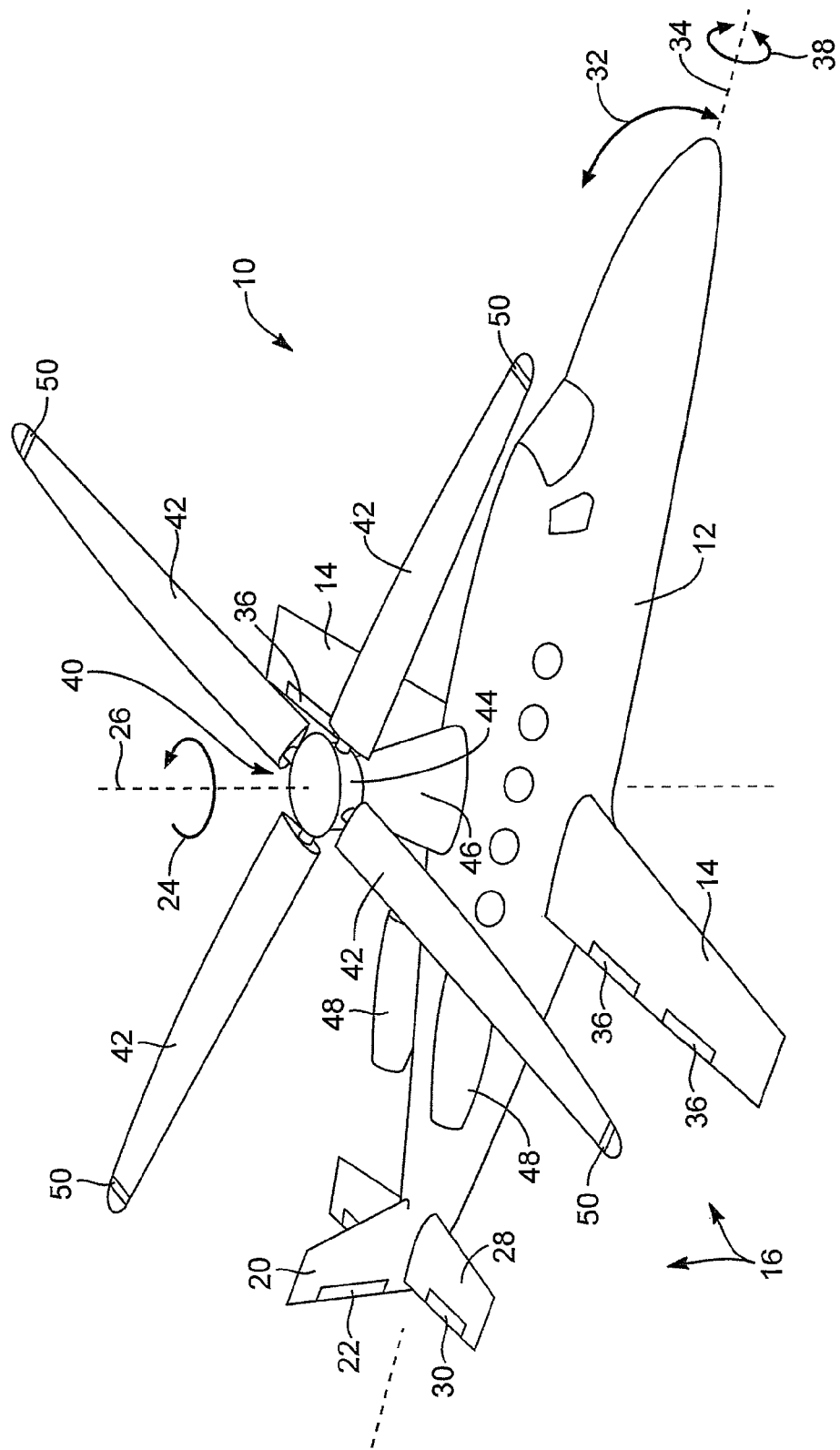
FIG. 1 is an isometric view of an aircraft in accordance with an embodiment of the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

This patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

Referring to FIG. 1, an aircraft 10 includes a fuselage 12 defining a cabin for carrying an operator, passengers, cargo, or the like. The fuselage 12 may include one or more fixed wings 14 shaped as airfoils for providing lift to the aircraft. The wings 14 may be configured such that they provide sufficient lift to overcome the weight of the aircraft 10 only at comparatively high speeds inasmuch as the aircraft 10 is capable of vertical takeoff and landing (VTOL) and does not need lift from the fixed wings 14 at low speeds, e.g. below 50 mph or even 100 mph upon taking off.

In this manner, the wings 14 may be made smaller than those of fixed wing aircraft requiring a high velocity takeoff, which results in lower drag at higher velocities. In some embodiments the wings 14 provide sufficient lift to support at least 50 percent, preferably 90 percent, of the weight of the aircraft 10 at air speeds above 200 mph.

Control surfaces 16 may secure to one or both of the fuselage 12 and wings 14. For example a tail structure 18 may include one or more vertical stabilizers 20 and one or more rudders 22. The rudders 22 may be adjustable as known in the art to control the yaw 24 of the aircraft 10 during flight. As known in the art, yaw 24 is defined as rotation about a vertical axis 26 of the aircraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable as known in the art to alter the pitch 32 of the aircraft 10. As known in the art, pitch 32 is defined as rotation in a plane containing the vertical axis 26 and a longitudinal axis 34 of the fuselage of an aircraft 10. In the illustrated embodiment, the elevator 30 is a hinged portion of the horizontal stabilizer 28.

In some embodiments, twin rudders 22 may be positioned at an angle relative to the vertical axis 26 and serve both to adjust the yaw 24 and pitch 32 of the aircraft 10.

The control surfaces 16 may also include ailerons 36 on the wings 14. As known in the art, ailerons 36 are used to control roll 38 of the airplane. As known in the art, roll 38 is defined as rotation about the longitudinal axis 34 of the aircraft 10.

Lift during vertical takeoff and landing and for augmenting lift of the wings 14 during flight is provided by a rotor 40 comprising a number of individual blades 42. The blades are mounted to a rotor hub 44. The hub 44 is coupled to a mast 46 which couples the rotor hub 44 to the fuselage 12. The rotor 40 may be selectively powered by one or more engines 48 housed in the fuselage 12, or adjacent nacelles, and coupled to the rotor 40. In some embodiments, jets 50 located at or near the tips of the blades 42 power the rotor 40 during takeoff, landing, hovering, or when the flight speed of the aircraft is insufficient to provide sufficient autorotation to develop needed lift.

Figure 2:
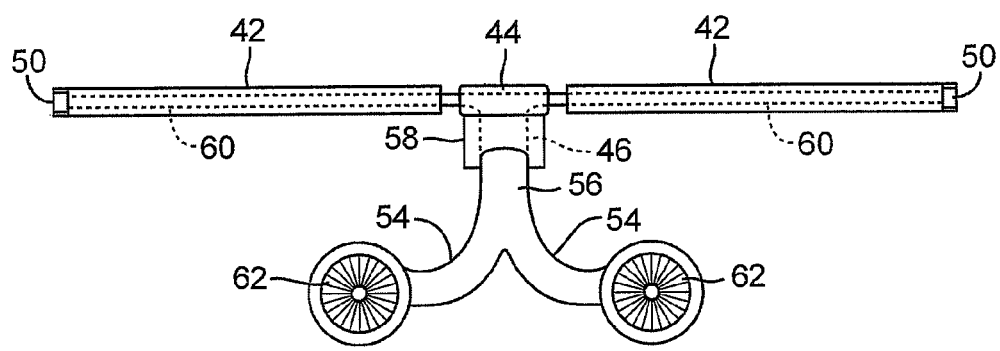
FIG. 2 is a front elevation view of a compressed or otherwise pressurized air supply for a tip jet in accordance with an embodiment of the present invention.

Referring to FIG. 2, while still referring to FIG. 1, in the illustrated embodiment, the engines 48 may be embodied as jet engines 48 that provide thrust during flight of the aircraft. The jet engines 48 may additionally supply compressed air to the jets 46 by driving a bypass turbine 62 or auxiliary compressor. Air compressed by the bypass turbine 62 may be transmitted through ducts 54 to a plenum 56 in fluid communication with the ducts 54.

The plenum 56 is in fluid communication with the mast 46 that is hollow or has another passage to provide for air conduction. A mast fairing 58 positioned around the mast 46 may provide one or both of an air channel and a low drag profile for the mast 46. The mast 46 or mast fairing 58 is in fluid communication with the rotor hub 44. The rotor hub 44 is in fluid communication with blade ducts 60 extending longitudinally through the blades 42 to feed the tip jets 50.

Figure 3A:
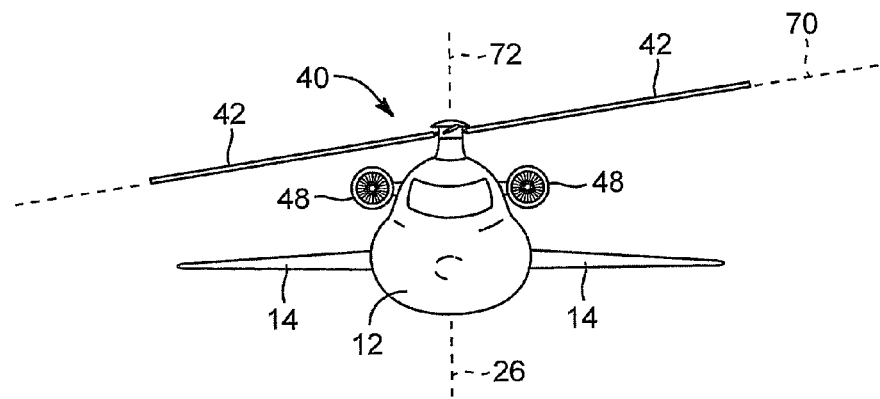
FIG. 3A is a front elevation view of a rotor craft illustrating operational parameters describing a rotor configuration suitable for use in accordance with embodiments of an apparatus and method in accordance with the present invention and the system of FIGS. 1 and 2 in particular.
Figure 3B:
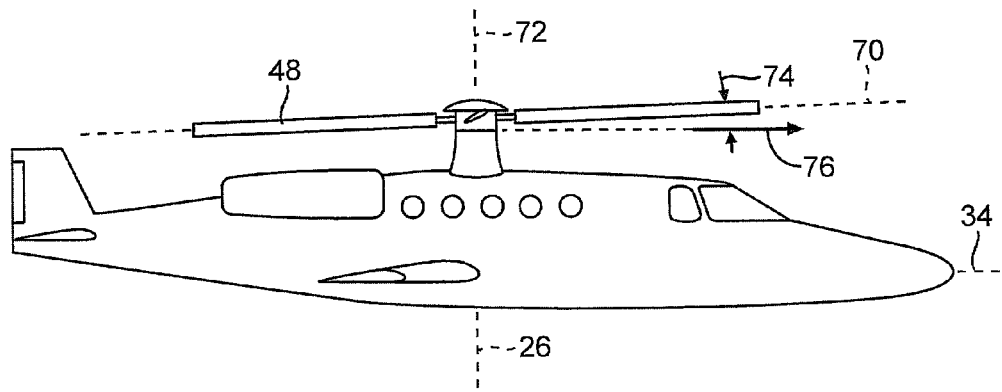
FIG. 3B is a right side elevation view of the rotor craft of FIG. 3A.
Figure 3C:
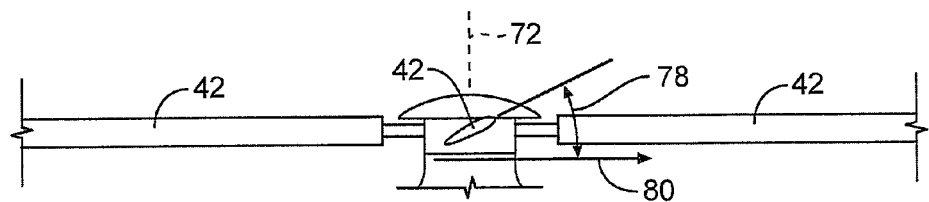
FIG. 3C is a partial cut of a right side elevation view of the rotor of FIG. 3A.

Referring to FIGS. 3A-3C, rotation of the rotor 40 about its axis of rotation 72 occurs in a rotor disc 70 that is generally planar but may be contoured due to flexing of the blades 42 during flight. In general, the rotor disc 70 may be defined as a plane in which the tips of the blades 42 travel. Inasmuch as the blades 42 flap cyclically upward and downward due to changes in lift while advancing and retreating, the rotor disc 70 is angled with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the angle of attack 74 or rotor disk angle of attack 74. For purposes of this application, flight direction 76 and air speed refer to the direction and speed, respectively, of the fuselage 12 of the aircraft 10 relative to surrounding air. In autogyro systems, the angle of attack 74 of the rotor disc 70 is generally positive in order to achieve autorotation of the rotor 40, which in turn generates lift.

Referring to FIG. 3C, the surfaces of the blades 42, and particularly the chord of each blade 42, define a pitch angle 78, or blade angle of attack 78, relative to the direction of movement 80 of the blades 42. In general, a higher pitch angle 78 will result in more lift and higher drag on the blade up to the point where stalling occurs, at which point lift has declined below a value necessary to sustain flight. the pitch angle 78 of the blade 42 may be controlled by both cyclic and collective pitch control as known in the art of rotary wing aircraft design.

Referring to FIGS. 4-9 while continuing to refer generally to FIGS. 1-10, an apparatus 70 in accordance with the invention may serve to provide collective pitch and throttle control to multiple pilots. Accordingly, the apparatus 70, or collective control 70 may be placed within the fuselage of an aircraft between the seats of a pilot and copilot. In accordance with the invention, either the pilot or copilot may be in the starboard seat, or the port seat.

In either position the control 70 is equally accessible and operates with the same sense. The names collective control 70, collective 70, or combination collective and throttle controller 70 may all be used for the apparatus 70. As a practical matter, the control 70 or apparatus 70 acts as both the collective pitch control for controlling the blade angle of attack as well as the throttle control for the engines.

In one embodiment of an apparatus 70 in accordance with the invention, the apparatus 70 may include a handle 72. The handle 72 is primarily responsible for the support of manipulation by the pilot in order to grip and operate the control 70. The handle 72 is located at the distal end of a lever system 74 or lever 74. The lever 74 provides a certain leverage advantage by a pilot in operating the collective control 70.

The leverage advantage is important for two reasons. If a mechanical linkage is relied upon, then the lever 74 provides a mechanical advantage. However, if the system is a "fly-by-wire" system, then the lever 74 still provides distance by which a pilot may more easily maintain the control and distinction between positions, physically and visually. The lever 74 may be secured in a mount 76. By pivoting within the mount 76, the lever 74 provides an arcuate path for the handle 72.

The mount 76 is secured to a base 78 positioning the mount, and thus the lever 74 and handle 72 at some distance above a deck or floor of a fuselage of an aircraft 10. In the illustrated embodiment, the base 78 may mount to the floor near the mounts for the starboard and port pilot seats. Accordingly, the height of the base 78 may be selected to position the mount 76 at an appropriate height, such that the lever 74 may extend substantially horizontal in a rest or spinup condition for the aircraft 10.

An apparatus 70 in accordance with the invention may include an actuator knob 80, which may also be referred to as simply an actuator 80 or a knob 80. The knob 80 is gripped between a thumb and forefinger, or between a thumb and the first two fingers of the hand of the pilot using it. One will notice that a pilot sitting in a starboard seat will use a left hand on the control 70, thus placing the thumb and forefinger of the left hand about the throttle knob 80 closest to the pilot.

In contrast, a pilot sitting in the port seat will have the right arm over the lever 74, and thus will grip the handle 72 with the right hand. Accordingly, the thumb and forefinger of the right hand will wrap around the knob 80a permitting the pilot to grip the knob 80a and rotate it with respect to the lever 74. In this way, the pilot, regardless of which pilot seat he is occupying, may grip the handle 72, and have immediate access, with the thumb and forefinger, to an appropriate knob 80 to control the throttle.

A very significant benefit of having the collective control 70 between the two pilots is that a single collective may serve both pilots, regardless of seating, without requiring two collectives 70 in the cockpit. Moreover, the throttle control is actuated in both circumstances by turning the top of the knob 80 away from the pilot. Thus, as a pilot pulls collective pitch, by lifting the handle 72, the natural motion of the hand is available to rotate the throttle knob 80 to add throttle.

For example, when a pilot has an arm extended along or above the lever 74, the fingers can wrap conveniently around the handle 72. Likewise, the thumb and forefinger, or the thumb and the first two fingers of the hand on the lever 74 and handle 72 may conveniently wrap around the knob 80, on either the right or left side, as appropriate.

Thus, as the pilot pulls collective pitch by lifting the handle 72, the hand still has the capacity to rotate forward at the wrist. Thus, rotating the top of the throttle control knob 80 forward and downward, or rather rotating the top surface of the knob 80 forward and downward, is permitted through a substantial distance. This is because the wrist is capable of bending downward almost a full ninety degrees.

By contrast, had the knob 80 been required to rotate backward at its top surface, then only about thirty degrees to forty five degrees of motion would be possible in the wrist. Moreover, in such a configuration, the wrist would itself need to drop down into the space occupied by the lever 74. Thus, rotating the knob 80 would be very difficult for a pilot in this situation.

Accordingly, in an embodiment as illustrated, the wrist can roll upward, forward and while the fingers roll forward and down, as desired. The wrist rises away from the lever 74, while the pilot naturally uses such a position of the hand to pull the handle 72 upward. Meanwhile, any degree of rotation of the knob 80 desired by the pilot is readily available by rotating the wrist, and thus rotating the thumb and engaged fingers with the knob 80.

Continuing to refer to FIGS. 4-9, in one embodiment of an apparatus 70 in accordance with the invention, the actuator knob 80 may be provided with a release button 81 on one end thereof. In certain embodiments, the entire knob 80 may simply be biased outward away from the grip 82 portion of the handle 72. In this embodiment, pressure by the thumb of a pilot on the button 81 of the knob 80 may serve as a release.

In the illustrated embodiment, it may be valuable to provide indicators or detents for the ground idle position and a flight idle position. The detent restricting the throttle may serve the purpose of restricting, as well as reminding a pilot against rotating the throttle back to a low-idle setting lower than the minimum required by the engine in flight. Accordingly, a button 81 may be pressed in order to activate the throttle knob 80 to not pass the detent position.

In the illustrated embodiment, a button 81 translates axially along the axis of rotation of the knob 80. In this way, a pilot may press the button 81 and release or set a detent. In one embodiment, pressing the button 81 may cause the knob 80 to stop at the next detent position. In another embodiment, pressure on the knob button 81 may release the throttle knob 80 to rotate freely until it encounters the next detent. Thus, by positive actuation to set the detent or by positive actuation to release the detent, a button 81 may provide affirmative control of the knob 80 to capture it in key positions.

For example, in a helicopter, a typical throttle adjustment is a handle grip wrapping around the longitudinal axis of the collective lever. Meanwhile, the collective lever may be near the console or the door. In either event, a pilot rotates the throttle hand grip much as a motorcyclist would do. However, in an aircraft, as opposed to automobiles and trucks, more throttle is engaged by pushing the throttle forward. In a truck, or older automobiles, throttle is set by drawing the throttle knob away from the dashboard and toward the driver.

This becomes a problem for a dual-control aircraft. In previous systems, such as those of U.S. Pat. No. 6,347,770, incorporated herein by reference, the cyclic pitch control controls the roll, pitch, and yaw of the fuselage of an aircraft with respect to the rotor head. It may be controlled by twin control yokes linked between dual pilot seats in the cockpit. However, throttle controls may not easily be associated with collective pitch controls without adding to the size, width, and complexity of the cockpit. Accordingly, in an apparatus 70 in accordance with the invention, a single control 70 may be placed between the seats of dual pilots, and each may access the entire control 70 with a single hand.

Figure 4:
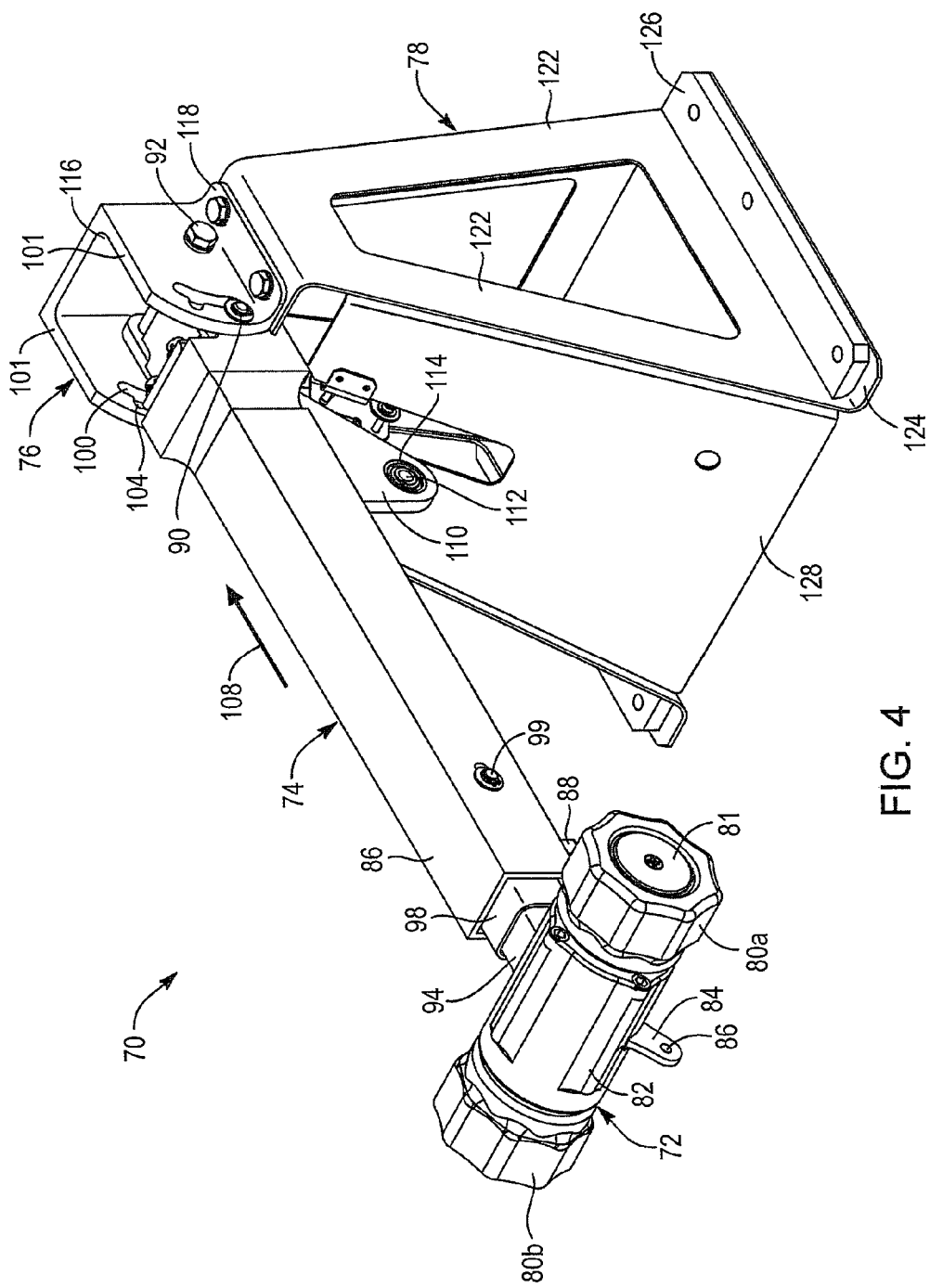
FIG. 4 is a perspective view of one embodiment of a collective pitch and throttle control system.
Figure 5:
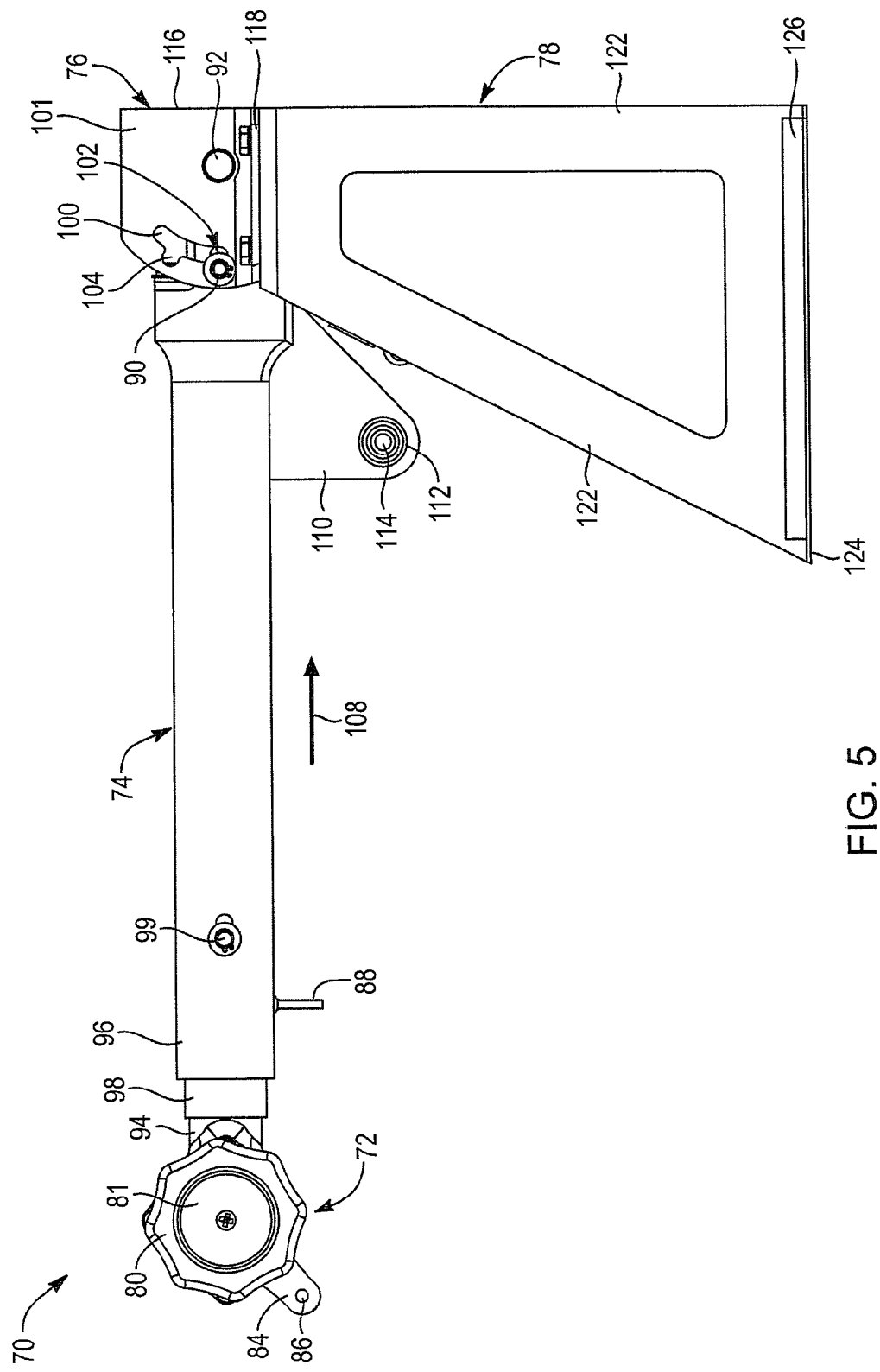
FIG. 5 is a left side elevation view thereof.
Figure 6:
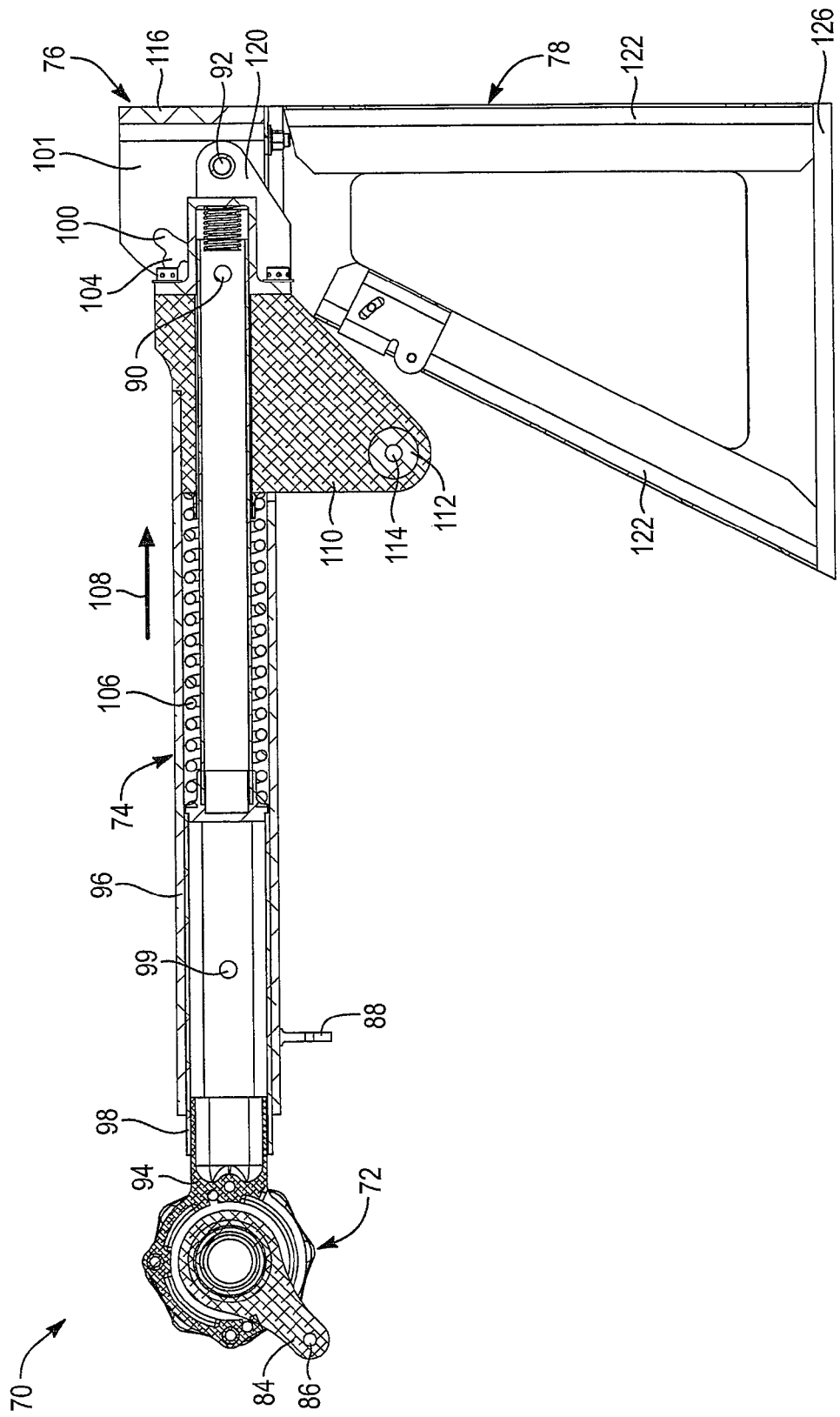
FIG. 6 is a left side elevation cut away view of the apparatus of FIG. 4.
Figure 7:
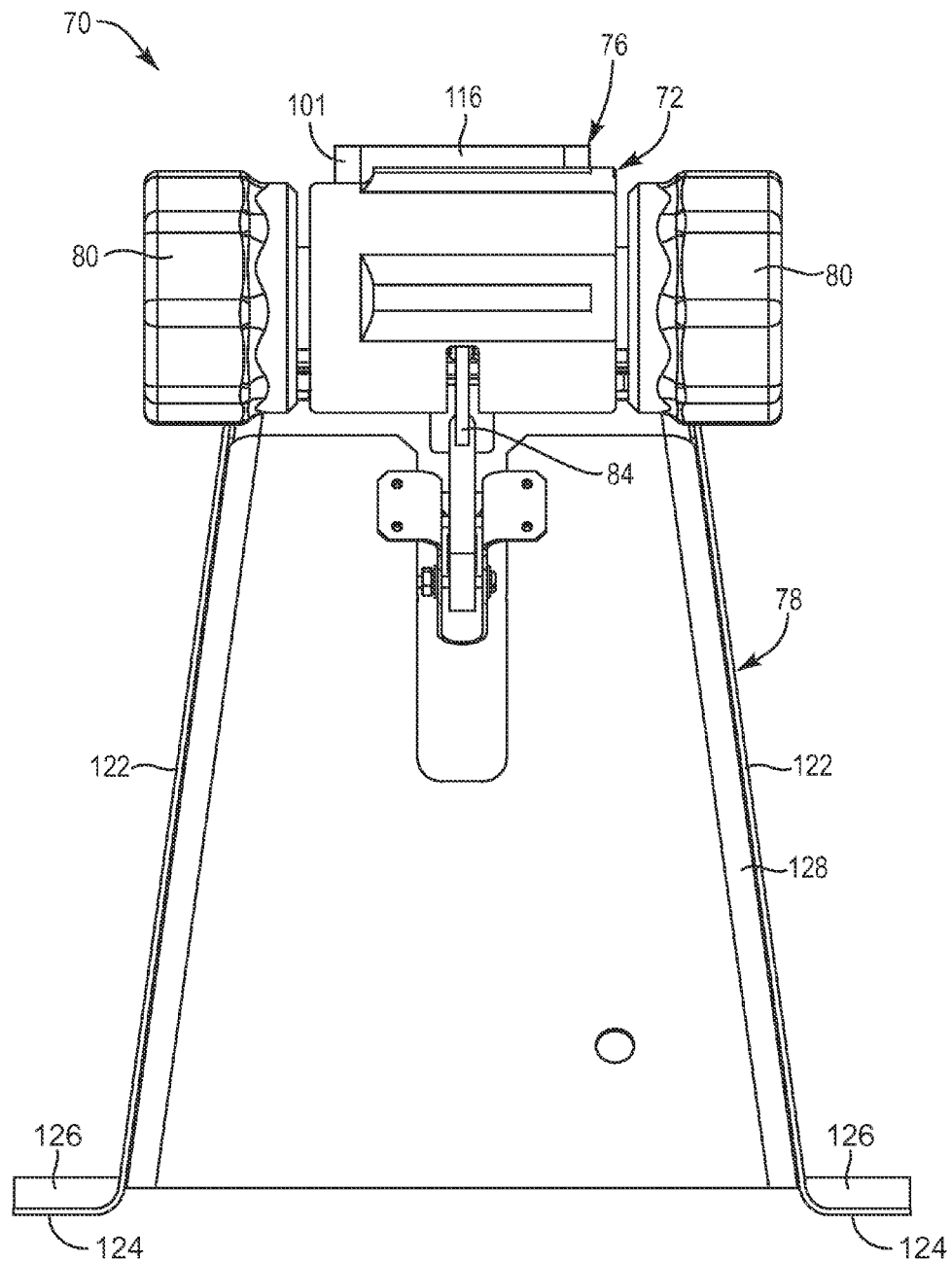
FIG. 7 is a frontal elevation view thereof.
Figure 8:
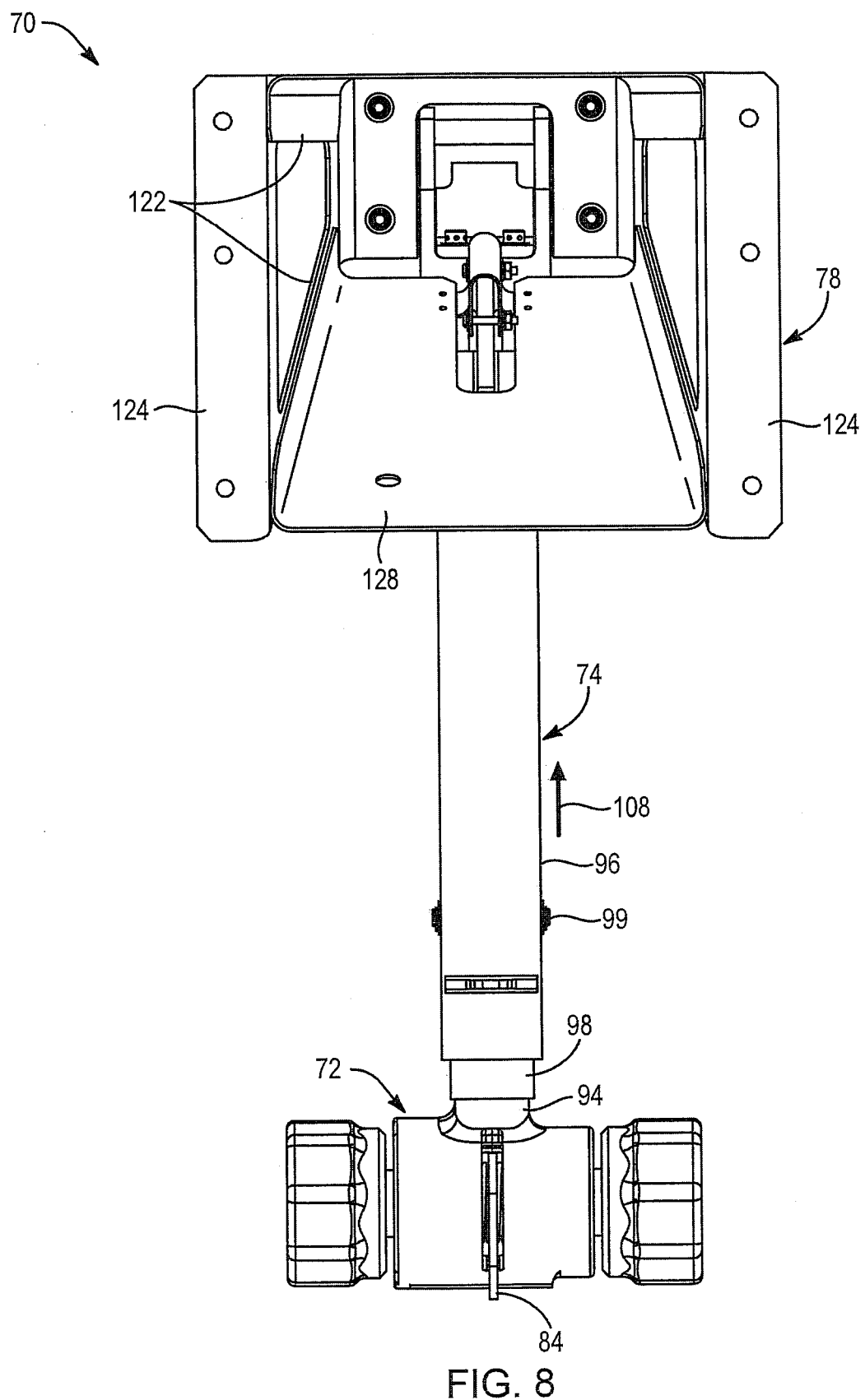
FIG. 8 is a bottom plan view thereof.
Figure 9:
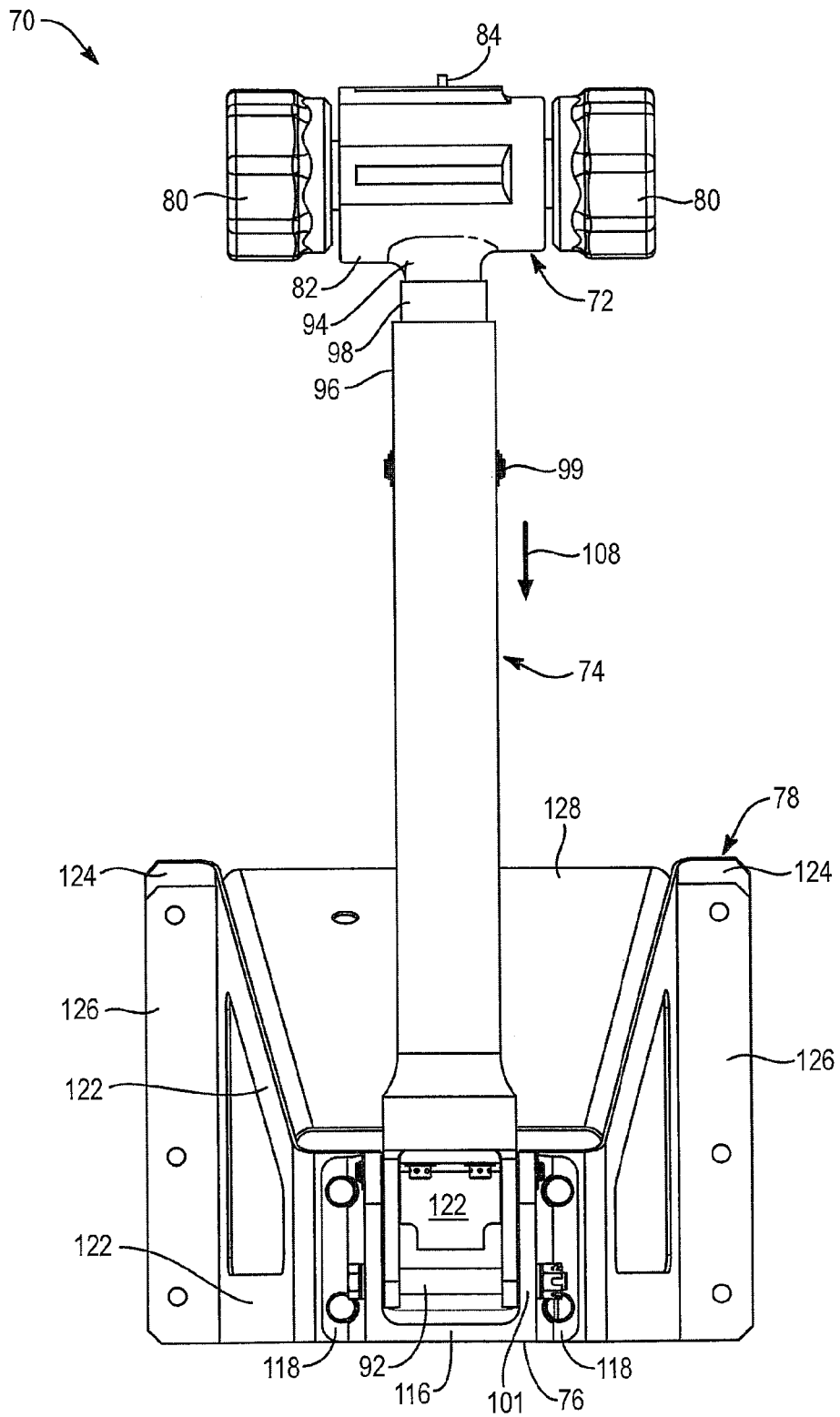
FIG. 9 is a top plan view thereof.
Figure 10:
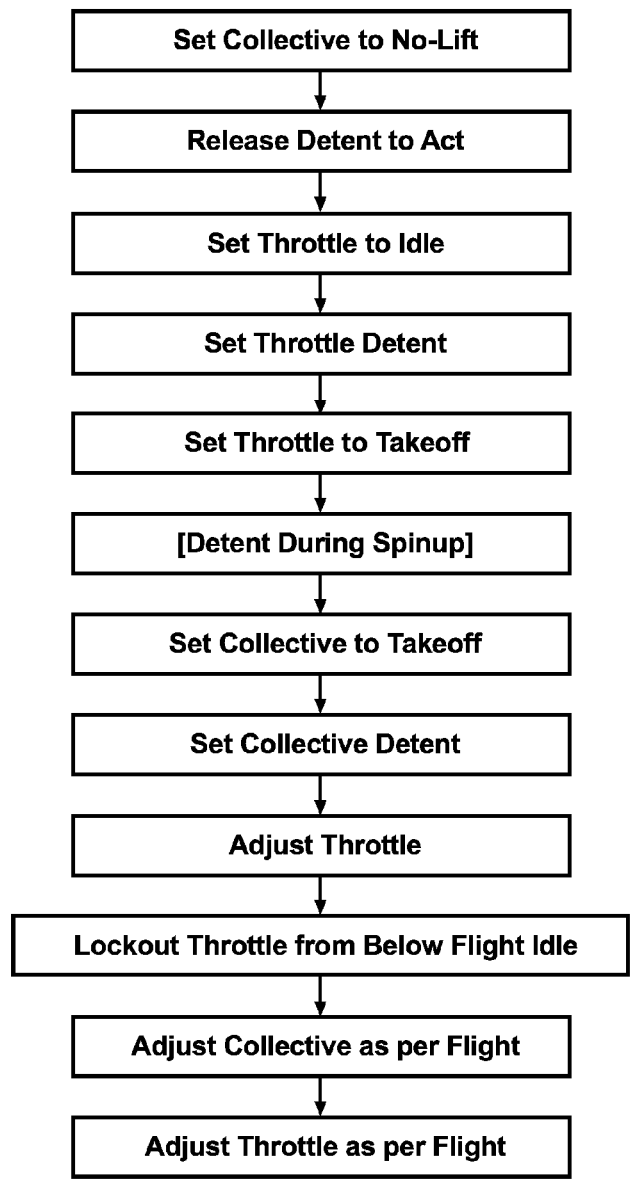
FIG. 10 is a schematic block diagram of one embodiment of a method in accordance with the invention implementing the apparatus illustrated.

Referring to FIGS. 4-6, while continuing to refer generally to FIGS. 1-10, the control 70 in an aircraft 10 may rely on texturing of some type to render the grip 82 as well as the knob 80 more readily susceptible to a securement by a hand of a user. For example, undulations such as periodic rises and depressions will increase above the effective friction of a hand on the grip portion 82 and the knob 80 of the handle 72. Similarly, checkering, knurling, grippy rubber, or the like may be used to render the grip 82 and the knob 80 more affirmatively engaging for manipulation by a pilot.

The knob 80 is part of a larger actuation system including a lever 84. Upon rotation of either knob 80, both knobs 80a, 80b rotate about a shared actuator or axle connected to a lever 84. The lever 84 is provided with an aperture 86, a cable, rod, or the like, whether braided wire, solid bar, single strand, enclosed, open, or the like may be connected to or through the aperture 86 to move with rotation of the lever 84. Accordingly, rotation of the knob 80 results in translation of the end of the cable or rod opposite the aperture 86 at the end of the lever 84.

As the top of the knob 80 moves forward, by being gripped and rotated by the thumb and forefinger or first two fingers of the hand of the pilot, the lever 84 rotates backward, translating the opposite end of the rod or cable, actuating the throttle control on the engine. In the illustrated embodiment, a guide 88 may be provided to support or otherwise direct the cable, wire, or rod along the lever portion 74 of the apparatus 70.

In general, the control 70 may provide a pin 90 near the aft end thereof. The pin 90 is connected through a shaft 94. More properly, the lever 74 may be made up of several constituent parts, some on the outside surface thereof, such as the housing 96 and some moving with respect to the housing 96, such as the shaft 94. In general, the shaft 94 may represent several components that are fixed to move together. Accordingly, a movement of the handle 72 may actually move the shaft 94 aft toward the base 78.

Referring to FIG. 6, while continuing to refer generally to FIGS. 1-10, the pin 90 extends along a lateral axis, orthogonal to a vertical (transverse) axis, and also orthogonal to a horizontal (longitudinal) axis along the center of the handle 72 and shaft 94. The pin 90 operates as a retainer. The shaft 94 is provided with a stop 98 or sleeve 98 through which the shaft 94 passes. Meanwhile, a retainer 99 may pass through the shaft 94, including its surrounding sleeve 98 securing both with respect to the housing 96.

A slot in the housing 96 may provide the retainer 99 a degree of movement fore and aft along the housing 96. In certain embodiments, the retainer 99 may actually be spring loaded and moveable in a lateral direction in order to lock the shaft 94 against further fore and aft motion. Nevertheless, this option need not be implemented in order for the control 70 to operate satisfactorally.

The pilot may grip the handle 72, and particularly the grip portion 82 thereof and pull it aft. By pulling the grip 82 aft, the shaft 94 moves backward with respect to the housing 96, which housing 96 cannot move radially against its axle 92. That is, through a series of brackets 120, the axle 92 secures the housing 96 to pivot exclusively circumferentially about the axle 92.

Thus, a pilot may draw the grip 82, and with it the shaft 94 of the lever 74 aft, toward the axle 92 about which the lever 74 pivots. This movement of the shaft 94 results in pushing the pin 90 aft to move freely along a way 100. The way 100 progresses or follows a circumference, also about the axle 92. Accordingly, the pin 90 pivots about the axle 92 as the housing 96 of the lever 74 lifts.

In certain embodiments, the axle 92 is supported between the wings 101 or walls 101 of the mount 76. For example, the mount 76 may be formed to have legs 101, walls 101, or wings 101 extending on either side of the axle 92. Accordingly, the axle 92 may penetrate and be secured to the wings 101 to suspend the bracket 120 therebetween.

Two detent slots 102, 104 or more may be formed to extend off the way 100. Thus, in the position illustrated in FIG. 6, the pin 90 initially sits in a first detent slot 102. In this position, the control 70 is set at a minimum collective pitch, and even may be set at a negative collective pitch in order that the rotor of the aircraft 10 provide no lift. In this position, the aircraft may spin up the rotor thereof in preparation for a vertical takeoff.

Meanwhile, upon takeoff, a pilot may draw the grip 82 rearward, thus driving the shaft 94 to remove the pin 90 from the detent slot 102. Now the pilot may lift the grip 82, thus rotating the lever 84 upward freely. As the pilot does so, the pilot may add throttle by turning the wrist down while rotating the throttle knob 80 forward (the top thereof forward) in order to increase throttle setting. Note that the top of the knob 80 moves forward to increase engine speed, regardless of whether a right or left hand seat (starboard or port seat, respectively) is being used, and thus whether or not a left or right hand is being used to actuate the knob 80 and the grip 82.

The pilot may choose to release the grip 82 to move forward, thus capturing the pin 90 in the detent slot 102. Thus, the control 70 may be "locked" in a takeoff position at a high angle of collective pitch or blade angle of attack. Other detent positions may be set for cruising flight, or the like.

For example, at high advance ratios, the rotor blades are positioned to be relatively flat or to have a low angle of attack. In such a circumstance, the cyclic pitch, and the rotor disk angle of attack, still remain positive. Nevertheless, the interaction between cyclic pitch and collective pitch combine to autorotate the rotor of the aircraft 10 even when the collective pitch has been set to the first detent slot 102 at which the minimum blade angle of attack is effected.

The force on the shaft 94, forcing it forward may be provided by a compression spring 106. In other embodiments, the spring 106 may be a tension spring, and the detents may be operated by the spring 106 pulling the shaft 94 aft. In such a circumstance, each of the detents 102, 104 may be placed on the opposite side of the way 100 in order to be extracted therefrom by a forward pressure on the grip 82. Nevertheless, with the hand wrapped around the front of the grip 82 an affirmative force may be loaded axially along the shaft 94 to operate the control 70 as illustrated in FIG. 6.

The aft 108 or rearward 108 direction may be thought of as the direction toward the rear of the craft. When the pin 90 is in the upper detent slot 102, the angle of the lever 74 does not render compression of the spring 106 exactly directly aft 108. Nevertheless, the direction 108 is generally aft with respect to the aircraft.

In one embodiment, a draw bar 110 may extend from the mount 76 fixed with respect to the housing 96 of the lever 84. Rotation of the aperture 112 about the pivot point 92 or the axle 92 of the lever 74 results in a substantial movement of the aperture 112 in a forward direction, and also in an upward direction. Accordingly, a clevis or other connector may connect between the aperture 112 and the collective pitch actuation of the aircraft 10. In some embodiments, the aperture 112 may be provided with a bearing 114 to ease rotation and to minimize friction of any connecting clevis.

Referring to FIG. 6, while continuing to refer generally FIGS. 1-10, a linkage connecting to the aperture 112 of the draw bar 110 moving with the lever 74 may connect to a servo, a detector, or even to a mechanical linkage. In some embodiments, literal physical force exerted by a pilot on the collective lever system 70 may mechanically control the blade angle of attack or collective pitch of the rotator blades. Nevertheless, in other embodiments, the aperture 112 may simply secure to a linkage that provides feedback to or through a detector capable of detecting motion of the draw bar 110, and that motion may then be translated to movement of the blade angle of attack through suitable actuators.

In general, the base 78 may include any suitable structure for mounting the mount 76 to the airframe. In general, the back 116 of the mount 76 may be open or closed. In the illustrated embodiment, the mount 76 is monolithic, wherein the back 116 secures to the wings 101 or legs 101, and both are thereby fixed with respect to flanges 118. The flanges 118 serve to secure the mount 76 to an upper surface of the base 78. Various suitable mechanisms may be implemented including an internal mount 76 fitting within a yoke or clevis of the mount 76.

In general, the bracket 120 may actually include within it the mount 76 in one embodiment. However, the illustrated embodiment provides a compact mechanism in which the combination of the mount 76 and the base 78 external to the bracket 120 of the control 70 provides shielding of moveable parts for both safety and reliability.

In general, the base 78 may include any suitable structure to position the axle 92 at the proper location. All directions may be considered, including height from the deck or floor of the aircraft 10, as well as the lateral positioning between the seats, and the longitudinal position along the floor in the fore and aft 108 directions of the aircraft.

In the illustrated embodiment, one lightweight and suitably strong mechanism for implementing a base 78 may include a pedestal 122 or legs at various locations. The illustrated embodiment shows four legs 122. Nevertheless, the legs 122 could be formed of a monocoque construction of sheet metal, properly reinforced, or the like. Nevertheless, considerable force may be applied by a user in some circumstances. For example, in a small aircraft 10, the collective pitch control 70 may literally connect mechanically to change the blade angle of attack of the rotor.

The legs 122 may terminate in flanges 124. In some embodiments, the legs 122 may all be formed by a stamping from sheet stock. In other embodiments, the legs 122 may each be formed of an angular material and be assembled to the flanges 124. The flanges 124 may also be provided with other hardware 126, such as buffers 126 or clamps 126 in order to secure the flanges 124 against the deck or floor of the aircraft 10.

In some embodiments, the legs 122 may be provided with a cover 128 preventing fingers or equipment or other things to occupy the space within the base 78. In this manner, the safety and the reliability of the control 70 may be increased by preventing access to the region of the several moving parts and linkages that connect to the control 70.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
  an aircraft comprising
    a fuselage, having a starboard pilot position and a port pilot position for accommodating pilots, the fuselage defining a longitudinal axis extending fore and aft, a lateral axis extending orthogonally therefrom, and a transverse axis orthogonal to the longitudinal and lateral axes and extending substantially vertically,
    an engine, having a throttle configured to advance to increase power output thereof and to retreat to decrease power output thereof, a rotary wing, connected to the fuselage and sized to fully support the weight of the aircraft at takeoff,
    the rotary wing, operable to reduce drag thereof at an advance ratio greater than one by effecting a reduction of lift therefrom to less than half the force required to support the aircraft in flight, and
    a fixed wing, connected to the fuselage and sized to fully support the weight of the aircraft at an advance ratio greater than one;
  a lever having first and second ends, and a pivot proximate the second end, the pivot defining a first axis of rotation parallel to the lateral axis and being positioned between the starboard and port pilot positions, and the lever being operably connected to control collective pitch of the rotary wing;
  a handle connected proximate the first end and sized to be gripped selectively from the starboard and port pilot positions to control collective pitch by pivoting the lever, the handle secured to the lever proximate the first end of the lever and defining a first side and a second side offset from the lever along the lateral axis, the lever being positioned between the first and second side; and
  a throttle actuator, rotatably connected to the handle, the throttle actuator including a first throttle knob secured to the first side of the handle and a second throttle knob secured to the second side of the handle, the first and second throttle knobs both being rotatable about a second axis of rotational parallel to the first axis of rotation, the first and second throttle knobs being coupled by a common link to the throttle.

2. The apparatus of claim 1, wherein the advance ratio is greater than 1.5.

3. The apparatus of claim 2, wherein the reduction of lift is about 90 percent of the force required to support the aircraft in flight.

4. The apparatus of claim 3, wherein the advance ratio is greater than 2.

5. The apparatus of claim 4, wherein the reduction of lift is about 100 percent of the force required to support the aircraft in flight.

6. The apparatus of claim 3, wherein the reduction of lift is about 90 percent of the force required to support the weight of the aircraft in flight.

7. The apparatus of claim 6, wherein the reduction of lift is about 100 percent of the force required to support the aircraft in flight.

8. The apparatus of claim 1, wherein the advance ratio is greater than 2.

9. The apparatus of claim 1, further comprising a detent comprising:
  a detent plate including a plurality of slots radiating outwardly from the first axis of rotation;
  an outer sleeve rotatably mounted to the pivot;
  an inner member slidably mounted within the outer sleeve, the outer sleeve and inner member forming the lever, the inner member defining a pin sized and positioned to engage any of the plurality of slots; and
  a biasing member engaging the inner member and urging the inner member outwardly from the outer sleeve and biasing the pin into any slot of the plurality of slots.

10. The apparatus of claim 1, further comprising at least one detent urging at least one of the first and second throttle knobs to remain in a position selected from pre-flight, spin-up condition, an airborne takeoff condition, and a cruising flight condition.

11. A method of controlling an aircraft, the method comprising:
- providing the aircraft having a fuselage with a fixed wing and a rotary wing operably secured thereto, a starboard pilot position and a port pilot position for accommodating pilots, the fuselage defining a longitudinal axis extending fore and aft, a lateral axis extending orthogonally thereto, and a transverse axis extending substantially vertically, orthogonal to the longitudinal and lateral axes;
- the providing an aircraft, further comprising providing an engine, having a throttle configured to advance to increase power output thereof and to retreat to decrease power output thereof;
- the providing an aircraft, further comprising providing a lever having first and second ends and a pivot proximate the second end and positioned between the starboard and port pilot positions, the pivot defining a first axis of rotation parallel to the lateral axis, the lever being operably connected to control collective pitch of the rotary wing;
- the providing an aircraft, further comprising providing a handle connected proximate the first end and sized to be gripped selectively from the starboard and port pilot positions to control collective pitch by pivoting the lever, the handle secured to the lever proximate the first end of the lever and defining a first side and a second side offset from the lever along the lateral axis, the lever being positioned between the first and second side;
- the providing an aircraft, further comprising providing a throttle actuator, rotatably connected to the handle to be accessible and operable selectively from the starboard and port pilot positions, operable simultaneously with the lever while controlling collective pitch, rotating about an actuator axis parallel to the lateral axis, and advancing the throttle of the aircraft by rotating the top thereof forward along the longitudinal axis, the throttle actuator including a first throttle knob secured to the first side of the handle and a second throttle knob secured to the second side of the handle, the first and second throttle knobs both being rotatable about a second axis of rotational parallel to the first axis of rotation, the first and second throttle knobs being coupled by a common link to the throttle;
- arbitrarily selecting a selected pilot position from the starboard and port pilot positions;
- setting, by a pilot in the selected pilot position, both the throttle actuator and lever to effect setting the throttle and collective pitch to a spin-up position;
- simultaneously increasing, by the pilot in the selected pilot position, the collective pitch by lifting of the lever while advancing throttle by rotating the top of the throttle actuator forward along the longitudinal axis;
- taking off by the aircraft;
- setting, by the pilot, the collective pitch to a cruise position by moving the lever down upon the aircraft achieving a speed at which lift from the fixed wing supports most of the weight of the aircraft; and
- advancing the throttle to increase speed of the aircraft while simultaneously decreasing collective pitch to a minimum value insufficient to support half the weight of the aircraft by rotating either of the first and second throttle knobs.

12. The method of claim 11, further comprising setting the lever at a collective detented position.

13. The method of claim 12, wherein the collective detented position is selected from a first position effective to set the collective pitch at a no-lift position, a second position effective to set the collective pitch at a takeoff lift position, and a third position effective to set the collective pitch at a cruising lift position.

14. The method of claim 12, further comprising setting the throttle actuator to a throttle detented position.

15. The method of claim 14, wherein the throttle detented position is selected from a first detent effective to set the throttle at an idle position, a second detent effective to set the throttle at a takeoff position, and a third detent effective to set the throttle at a cruising position.

16. The method of claim 15, wherein the lever further comprises a resilient member operating between a pivoting member and a translating member, the pivoting member moving substantially exclusively in a pivoting motion, and the translating member moving in a substantially exclusively translating motion with respect to the pivoting member and against the resilience of the resilient member to free the lever to pivot by removing a catch from the collective detented position.

17. The method of claim 12, wherein the lever further comprises a resilient member operating between a pivoting member and a translating member, the pivoting member moving substantially exclusively in a pivoting motion, and the translating member moving in a substantially exclusively translating motion with respect to the pivoting member and against the resilience of the resilient member to free the lever to pivot by removing a catch from the collective detented position.

18. The method of claim 11, further comprising setting the throttle actuator to a throttle detented position, wherein the throttle detented position is selected from a first detent effective to set the throttle at an idle position, a second detent effective to set the throttle at a takeoff position, and a third detent effective to set the throttle at a cruising position.

19. The method of claim 11, further comprising releasing the lever to pivot by moving a catch away from a detent position by drawing the handle toward the second end of the lever.

20. A method for controlling an aircraft comprising:
- providing an aircraft comprising
  - a fuselage, having a starboard pilot position and a port pilot position for accommodating pilots, the fuselage defining a longitudinal axis extending fore and aft, a lateral axis extending orthogonally therefrom, and a transverse axis orthogonal to the longitudinal and lateral axes and extending substantially vertically,
  - an engine, having a throttle configured to advance to increase power output thereof and to retreat to decrease power output thereof,
  - a rotary wing, connected to the fuselage and sized to fully support the weight of the aircraft at takeoff,
  - the rotary wing, operable to reduce drag thereof at an advance ratio greater than one by effecting a reduction of lift therefrom to less than half the force required to support the aircraft in flight,
  - a fixed wing, connected to the fuselage and sized to fully support the weight of the aircraft at an advance ratio greater than one;
- providing a lever having first and second ends, and a pivot proximate the second end, the pivot defining a first axis of rotation parallel to the lateral axis and being positioned between the starboard and port pilot positions, and the lever being operably connected to control collective pitch of the rotary wing;
- providing a handle connected proximate the first end and sized to be gripped selectively from the starboard and port pilot positions to control collective pitch by pivoting the lever, the handle secured to the lever proximate the first end of the lever and defining a first side and a second side offset from the lever along the lateral axis, the lever being positioned between the first and second side;

providing a throttle actuator, rotatably connected to the handle to be accessible and operable selectively from the starboard and port pilot positions, operable simultaneously with the lever while controlling collective pitch, rotating about an actuator axis parallel to the lateral axis, and advancing the throttle of the aircraft by rotating the top thereof forward along the longitudinal axis, the throttle actuator including a first throttle knob secured to the first side of the handle and a second throttle knob secured to the second side of the handle, the first and second throttle knobs both being rotatable about a second axis of rotational parallel to the first axis of rotation, the first and second throttle knobs being coupled by a common link to the throttle;

selecting a selected position from the starboard and port pilot positions;

setting the throttle to an idle position by the pilot in the selected position using a knob of the first and second throttle knob closest to the selected position;

setting the throttle to a spin-up position subsequent to setting the throttle to the idle position;

setting, by the pilot in the selected position, the collective pitch to a takeoff position while simultaneously adjusting the throttle by rotating the throttle actuator;

taking off by the aircraft being lifted exclusively by the rotary wing;

increasing the velocity of the aircraft above an advance ratio of one; and adjusting the collective pitch to load the fixed wing with about 90 percent of the weight of the aircraft and unload, correspondingly, the rotary wing.

\* \* \* \* \*